(12) United States Patent
Kim et al.

(10) Patent No.: US 8,941,918 B2
(45) Date of Patent: Jan. 27, 2015

(54) 3D IMAGE DISPLAY DEVICE

(75) Inventors: Sung Kyu Kim, Seoul (KR); Seon Kyu Yoon, Jeju-si (KR)

(73) Assignee: Korea Institute of Science and Technology, Seoul (KR)

( * ) Notice: Subject to any disclaimer, the term of this patent is extended or adjusted under 35 U.S.C. 154(b) by 801 days.

(21) Appl. No.: 12/637,098

(22) Filed: Dec. 14, 2009

(65) Prior Publication Data

US 2010/0182688 A1 Jul. 22, 2010

(30) Foreign Application Priority Data

Jan. 21, 2009 (KR) ........................ 10-2009-0005211

(51) Int. Cl.
*G02B 27/22* (2006.01)
*G02B 27/26* (2006.01)
*G02B 27/00* (2006.01)

(52) U.S. Cl.
CPC ........ *G02B 27/2214* (2013.01); *G02B 27/2264* (2013.01); *G02B 27/22* (2013.01); *G02B 27/0093* (2013.01); *G02B 27/26* (2013.01)
USPC ............. 359/464; 359/462; 359/465; 348/56; 348/58

(58) Field of Classification Search
CPC .. G02B 27/2264; G02B 27/22; G02B 27/226; G02B 27/2228; G02B 27/225; H04N 13/0409; H04N 13/0434
USPC .................. 359/464, 465, 462; 348/51, 58, 56
See application file for complete search history.

(56) References Cited

U.S. PATENT DOCUMENTS

| | | | |
|---|---|---|---|
| 4,829,365 A * | 5/1989 | Eichenlaub | 348/54 |
| 6,094,216 A * | 7/2000 | Taniguchi et al. | 348/51 |
| 7,190,518 B1 * | 3/2007 | Kleinberger et al. | 359/465 |
| 2005/0057441 A1 * | 3/2005 | Park | 345/9 |
| 2006/0001968 A1 * | 1/2006 | Kim et al. | 359/465 |

FOREIGN PATENT DOCUMENTS

| | | | | |
|---|---|---|---|---|
| KR | 2002-59028 | | 7/2002 | |
| KR | 2006-32547 | | 4/2006 | |
| WO | WO 2004010203 A1 * | 1/2004 | | G02B 27/22 |
| WO | WO 2007083983 A1 * | 7/2007 | | G02B 27/22 |

OTHER PUBLICATIONS

Office Action dated Mar. 29, 2010 corresponding to the Korean Patent Application No. 10-2009-0005211 (w/translation).

* cited by examiner

*Primary Examiner* — Audrey Y Chang
(74) *Attorney, Agent, or Firm* — Ohlandt Greeley Ruggiero & Perle L.L.P.

(57) ABSTRACT

The 3D image display device disclosed herein includes an image display panel outputting image signals; and a parallax barrier arranged in front of the panel, being spaced at a particular distance, and having a plurality of transparent portions. The transparent portions of the barrier have a plurality of transverse lines, each of which forms one cycle, and the transparent portions that are adjacent to each other in the longitudinal direction in one cycle are arranged to emit images to different fields of view, respectively. The panel operates on and off by lines in the transverse direction based on views.

9 Claims, 16 Drawing Sheets

3D IMAGE DISPLAY DEVICE

CROSS-REFERENCE TO RELATED APPLICATION

This application claims the benefit of, and priority to, Korean Patent Application No. 10-2009-0005211, filed on Jan. 21, 2009, under 35 U.S.C. §119. Korean Patent Application No. 10-2009-0005211 is herein incorporated by reference in its entirety.

BACKGROUND

1. Field

This disclosure relates to an image display device, specifically to an image display device displaying a three dimensional (hereinafter 3D) image without field-of-view overlapping effects and chromatic dispersion.

2. Description of the Related Art

Glasses-free 3D displays, which do not require special glasses, are being developed. However, such displays with two views impose limitations on the region within which a 3D image may be seen. Multiple or hypermultiple views have been introduced to improve this problem, but they require very high display resolution, or high speed display devices, preventing commercial use. Moreover, the barrier method or the dynamic barrier method for virtual reality, which provide 3D images corresponding at a viewer's position using a static parallax barrier, also have problems caused by the variation of resolution depending on situations. Further, the barrier method is not able to provide two dimensional (hereinafter 2D) images. Further, the dynamic barrier method requires an additional liquid crystal panel with great precision.

In all cases regarding two, multiple, or hypermultiple views using the static parallax barrier method of a glasses-free 3D display, a region in which a plurality of views coexist may develop, which is called a field-of-view overlapping effect. At the region, a three dimensional effect is eliminated or substantially deteriorated in principle, which is called the problem of a field-of-view overlapping effect.

FIG. 1 illustrates a 3D display device with two views using a parallax barrier. This method is associated with the problems of chromatic dispersion and field-of-view overlapping effects.

The 3D image display device includes a flat image display device 101 and a parallax barrier 102. The flat image display device 101 is composed of pixels in which red, green, and blue are arranged, respectively, in this order. The image transmitted through the parallax barrier 102 is represented at the field of view 103 of left and right eyes. In the flat image display device 101, the vertical lines of pixels in the left and right images vary alternatingly in the horizontal direction (104), and all pixels in the perpendicular direction operate simultaneously (105).

Reference numerals 106 to 108 represent the paths of rays corresponding to the left eye in order of blue (B), green (G), and red (R). Reference numerals 109 to 111 represent the paths of rays corresponding to the right eye in the same order.

Reference numerals 112 to 114 indicate the distribution and the brightness of each unit of color components for the view corresponding to the left eye, and reference numerals 115 to 117 represent those of each unit of color components for the view corresponding to the right eye. RGB image signals for left and right eyes should represent the same distributions and brightnesses with respect to each other for the same view, but may be dispersed as illustrated in FIG. 1, which is called chromatic dispersion.

Further, a region 118 in which each of views for left and right eyes overlap, i.e. field-of-view overlapping, may be formed.

Usually, in case that a static parallax barrier is used for two views, the problem of chromatic dispersion, i.e. the phenomenon that each rays of pixels disperses when transmitting the barrier, occurs to prevent colors from being accurately represented. Because the element representing color within each pixel is not uniformly distributed in the whole area, but is divided by particular zones, relative positions of rays of pixels are different from each other when the rays traverse the barrier. This difference leads to chromatic dispersion, which aggravates field-of-view overlapping effects.

Chromatic dispersion and field-of-view overlapping effects are found also in a method using lenses. It is because a parallax barrier is to replace lenses.

SUMMARY

The 3D image display device disclosed herein eliminates chromatic dispersion and field-of-view overlapping effects occurring in a glasses-free 3D image display device in order for a viewer to view the 3D image precisely. Further, in case that a 2D image is represented by the 3D image display device, the device minimizes the variation of the brightness of the image.

In one aspect, there is provided a glasses-free stereoscopic image display device, which includes an image display panel outputting image signals; and a parallax barrier arranged in front of the panel at a particular distance and having transparent portions repeating at particular intervals. The barrier eliminates chromatic dispersion and field-of-view overlapping effects caused by the relationship between the barrier and the panel. The image display device disclosed herein is characterized in that the arrangement of the transparent portions of the barrier, which correspond to each of views, may be modified in the transverse direction and the longitudinal direction, perpendicular to the transverse direction, and the arrangement and the operation of color component units of the device may be adjusted.

In one embodiment, the transparent portions of the barrier have the pattern of a particular cycle in the horizontal direction based on the reference viewing distance from the device, the sizes and the intervals of views, and the number of views. The number of repetition of the portions in the vertical direction may be determined based on the way by which the image is represented in the image display device.

In the embodiment, the pixels of the image display device which pass through the transparent portions of the parallax barrier may have different views from each other.

In the embodiment, the device may further include a position detector for tracking the position of a viewer or the viewer's both eyes. The detector may recognize that the viewer or the viewer's eyes are located at a field-of-view overlapping region where the images for each of views outputted from the display panel overlap.

In the embodiment, if the detector recognizes the viewer or the eyes located at the overlapping region, the panel may display horizontal pixel lines in which the field-of-view overlapping effect is small, and may turn off the horizontal pixel lines in which the field-of-view overlapping effect occurs.

In the embodiment, unit color components classified by pixels of red (R), greed (G), and blue (B), which were arranged in the horizontal direction, are rearranged into the vertical direction to eliminate chromatic dispersion.

In the embodiment, the panel may output the same image signals for image signals regarding each of views, and may operate on and off all pixel lines simultaneously to display a 2D image.

In another aspect, there is provided a 3D image display device which includes an image display panel outputting image signals; and a polarizing filter arranged in front of the panel at a particular distance and having polarizing portions and shielding portions, which are arranged alternatingly. The polarizing portions of the filter include a first group of polarizing films of which the orientation of polarization is vertical and a second group of polarizing films of which the orientation of polarization is horizontal, wherein the first and the second groups of films are adjacent to each other. The panel has polarizing films attached thereto, and operates on and off each of the lines of the horizontal direction based on views. The polarizing films attached to the panel are polarizing films, of which the orientations of polarization are vertical and horizontal, attached adjacent to each other by lines in the horizontal direction.

In the embodiment, the device further includes a position detector for tracking the position of a viewer or the viewer's both eyes. The detector may recognize that the viewer or the viewer's eyes are located at a field-of-view overlapping region, where the fields of view corresponding to each of views outputted from the panel overlap.

In the embodiment, if the detector recognizes the viewer or the viewer's eyes located at the overlapping region, the panel may display horizontal pixel lines in which the field-of-view overlapping effect is small, and may turn off the horizontal pixel lines in which the field-of-view overlapping effect occurs.

In the embodiment, color components classified by pixels of red (R), greed (G), and blue (B), which were arranged in the horizontal direction, are rearranged into the vertical direction to eliminate chromatic dispersion.

In the embodiment, the panel may output the same image signals for image signals regarding each of views, and may operate on and off all pixel lines simultaneously to display a 2D image.

According to the glasses-free 3D image display device disclosed herein, the effect of multiple views may be achieved with more than four views, and the field-of-view overlapping effect may be minimized by detecting a viewer. And, conversion between 2D and 3D images may be carried out easily even with a static parallax barrier. Moreover, the 3D display device disclosed herein may be applied to such 3D display as virtual reality and mixed reality.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
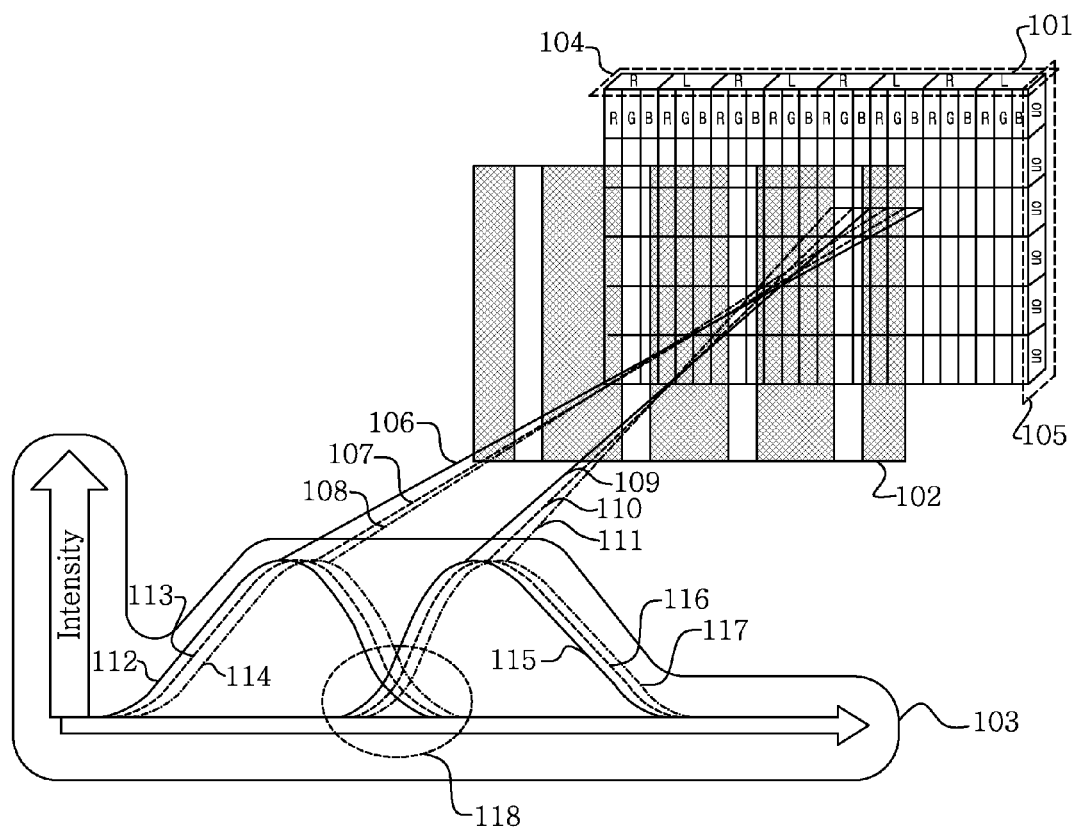
FIG. 1 illustrates a 3D display device with two views using a parallax barrier.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Figure 2A:
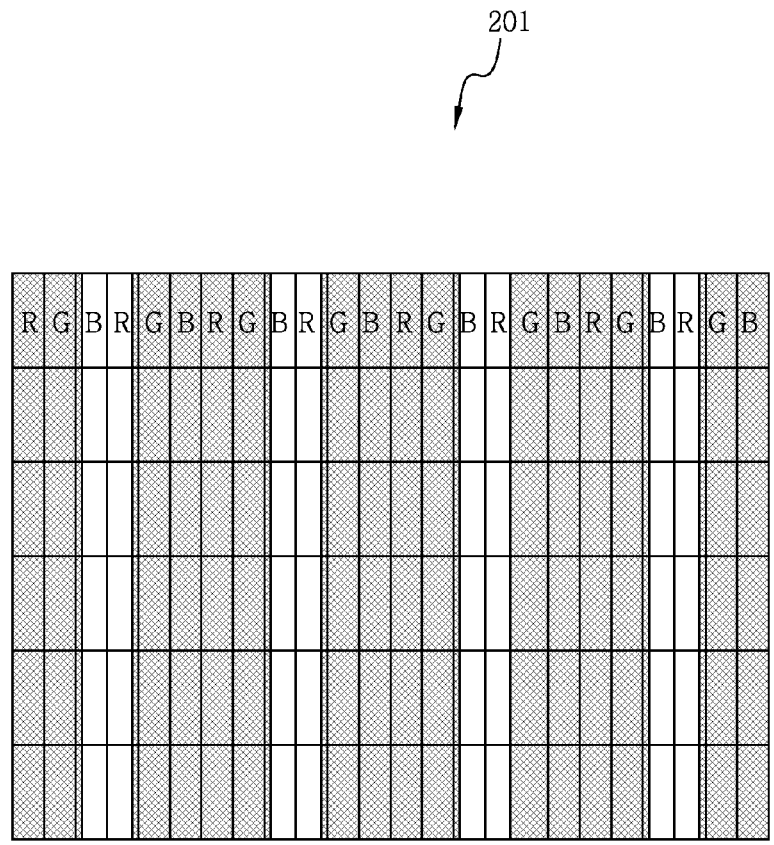
FIG. 2A is a front view of an existing parallax barrier and flat image display device.
Figure 2B:
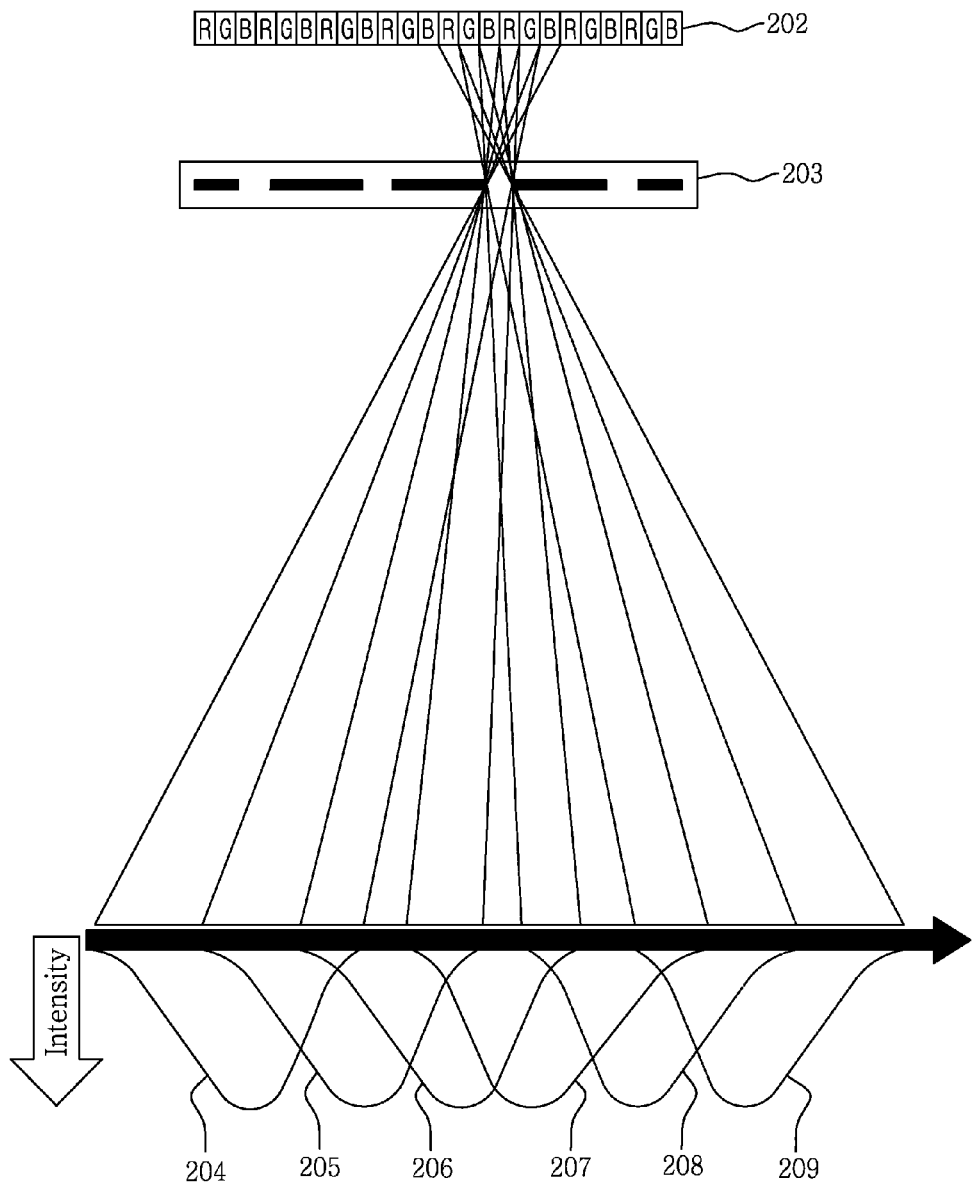
FIG. 2B illustrates chromatic dispersion occurring when the parallax barrier is used.

FIG. 2A is a front view of an existing parallax barrier and flat image display device, and FIG. 2B illustrates chromatic dispersion occurring when the parallax barrier is used, which is exaggerated for clarity.

In the flat panel image display 201, pixels are not used as the smallest unit, but colors in the pixels, which are smaller than the pixels, are used. FIGS. 2A and 2B represent that the arrangement of the color component units 202 is not matched up with the direction of the parallax barrier 203. Such colors pass through the parallax barrier 203 and represent image information at the field of view. However, as represented by the field of view, each of the colors may not correspond to each of views 204 to 209. This phenomenon is called chromatic dispersion, which causes several problems in observing a 3D image and aggravates view-overlapping effects, while dispersing the field of view.

This chromatic dispersion occurs due to the relative positions between the parallax barrier and color component units, and may be eliminated if the relative positions are adjusted to be the same. Moreover, if the color component units are arranged in the direction of the transparent portions of the barrier, the dispersion disappears owing to the radiation angle of the color component units. These are illustrated in FIGS. 3A and 3B.

Figure 3A:
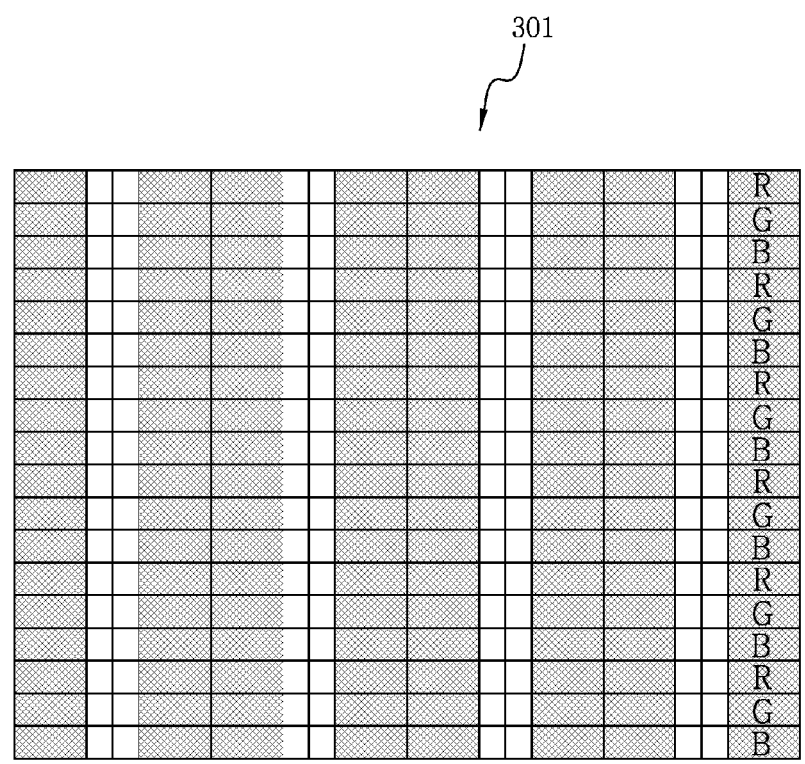
FIG. 3A is a front view of the arrangement of a parallax barrier and pixels on a flat panel image display.
Figure 3B:
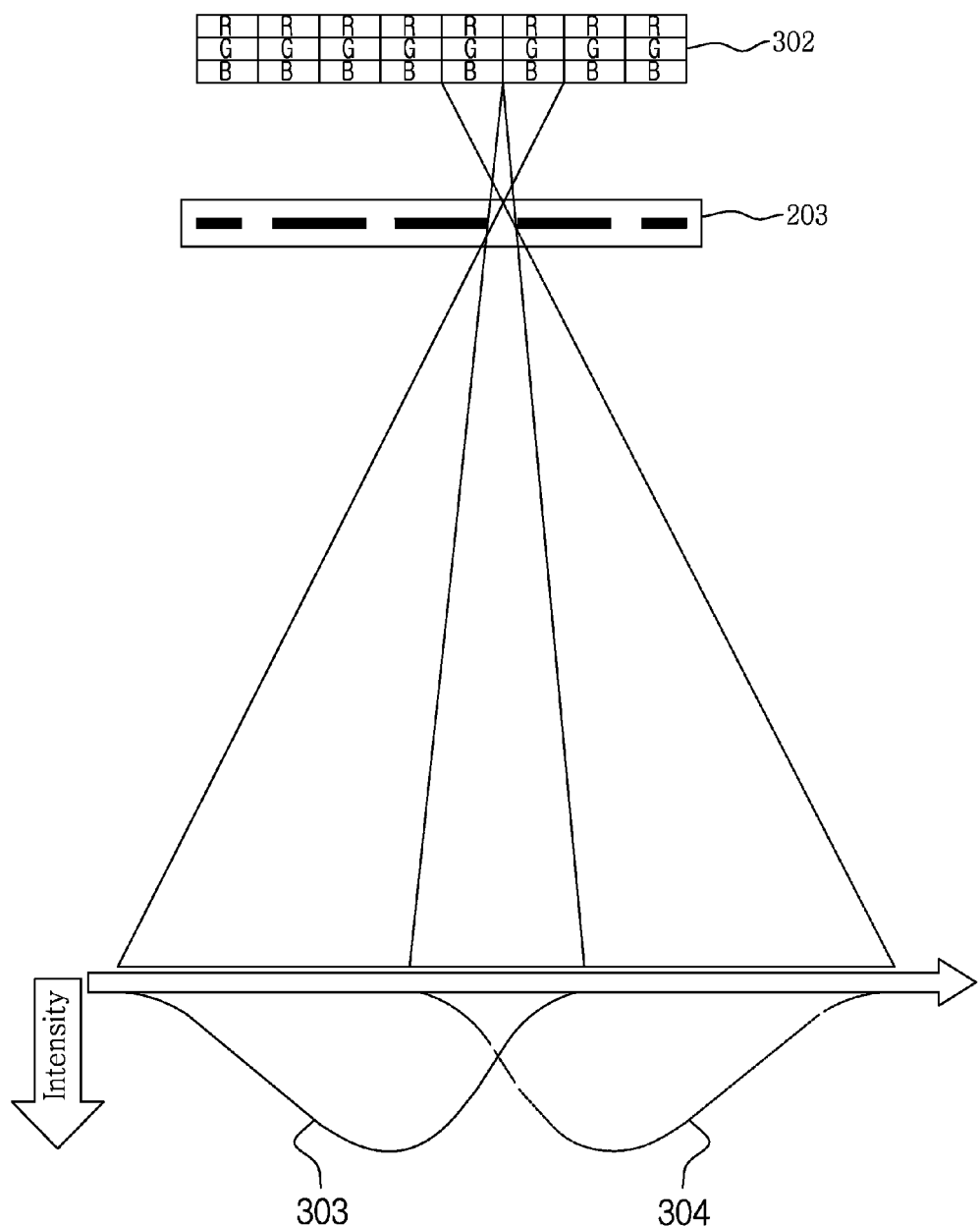
FIG. 3B illustrates a characteristic of the field of view formed by the display device of FIG. 3A.

FIGS. 3A and 3B represent an apparatus for eliminating the chromatic dispersion. FIG. 3A is a front view of the arrangement of a parallax barrier and pixels on a flat panel image display, and FIG. 3B illustrates a characteristic of the field of view formed by the display device of FIG. 3A.

In the display 301 of FIG. 3a, the arrangement of the color component units of the pixels is changed from the horizontal direction to the vertical direction. This change is to eliminate the chromatic dispersion by making the relative positions of the colors transmitted through the barrier to be identical. This effect may be acknowledged by the arrangement of the flat panel display and the barrier viewed from the top, and by the distribution of the brightness of color on the field of view. FIG. 3a represents that the arrangement of the color component units 302 is matched up with the direction of the parallax barrier 203. As shown in FIG. 3b, the fundamental pixels transmitted through the barrier are displayed at the same spots with the same distributions of the brightnesses, illustrated as 303 and 304. Therefore, the chromatic dispersion may disappear, and the view-overlapping effect may decrease.

Figure 4:
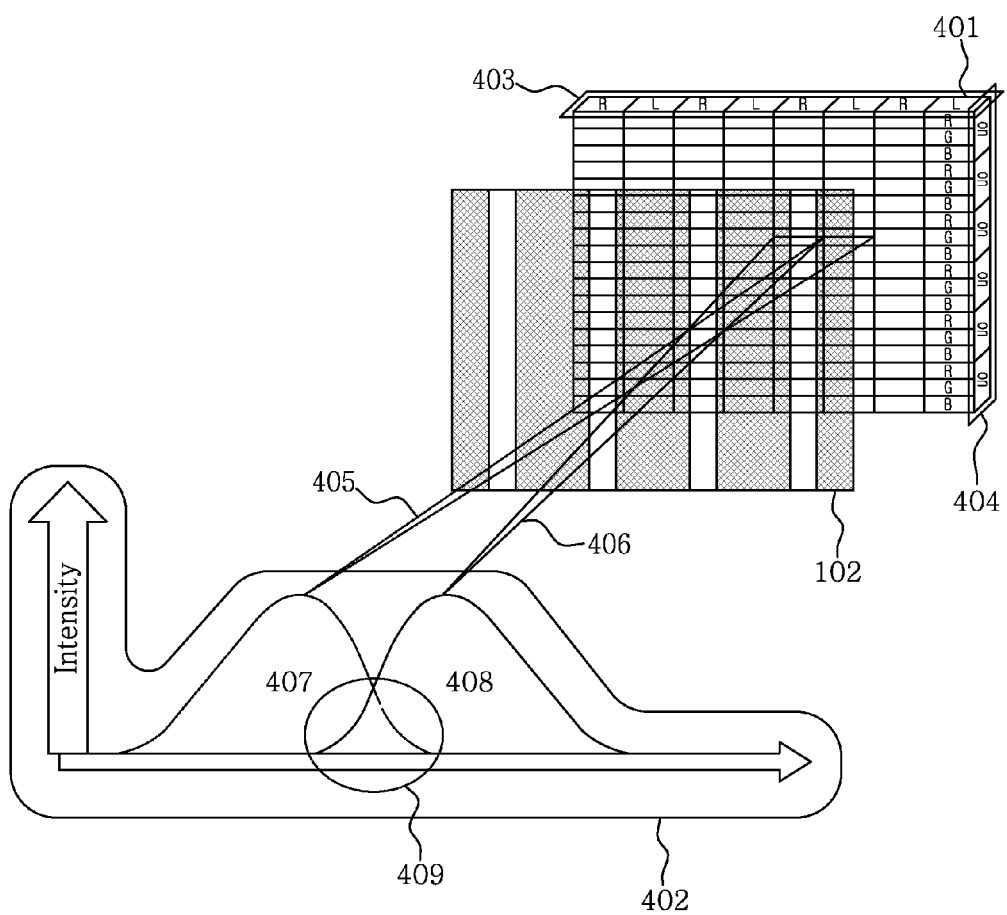
FIG. 4 is a diagrammatic view of a 3D display device having a static parallax barrier with two points of view, in which chromatic aberration is eliminated according to the embodiment of FIG. 3a, and of the distributions of brightness on the field of view.

FIG. 4 is a diagrammatic view of a 3D display device having a static parallax barrier with two points of view, in which chromatic aberration is eliminated according to the embodiment of FIG. 3a, and of the distributions of brightness on the field of view. The device has a flat panel image display device 401 and a parallax barrier 102. The barrier 102 is a static horizontal parallax barrier with two points of view, and is manufactured and arranged by calculating the distance from the display device and the cycle of the barrier, which are evaluated considering the position of a viewer. The image display device 401 represents the degree with which the viewer may effectively watch at his or her position the information represented, with two points of view, by the images formed the image display device as the distribution of brightness. The display device represents left-eye and right-eye images alternatingly from one unit of pixel in the horizontal direction (403), and all pixels of the lines in the vertical direction operate simultaneously (404). The information corresponding to the left eye and the information corresponding to the right eye in the display device pass through the horizontal parallax barrier and move to the left eye and right eye of the viewer, respectively. Reference numerals 407 and 408 of FIG. 4 reveal the amounts of images emitted to the left and right eyes of the viewer. The vertical direction of reference numerals 407 and 408 represents the intensity of the brightness to be seen, and the range in which the brightness spreads on the field of view is represented in the horizontal direction. The higher the distribution in the vertical direction and the narrower in the horizontal direction, the more precise the division between both eyes may be. The region 409 in which the distributions of rays 407 and 408 overlap is the one that the images of left eye and right eye overlap, and the two images coexist in this region, preventing a 3D image from being precisely seen. This phenomenon, in which the fields of view of the two eyes overlap, is called the field-of-view overlapping effect. The device disclosed herein is to eliminate such a region in order to provide a 3D image display device for producing a 3D image more precisely.

A 3D image display device according to the embodiment includes a parallax barrier having transparent portions with a particular pattern, and an image display panel of which each of horizontal lines operates with an interval of time.

The pattern of the parallax barrier disclosed herein includes a parallax barrier having a plurality of transparent portions. A plurality of horizontal lines of the transparent portions form one cycle. In the cycle, the transparent portions, each of which is adjacent in the vertical direction, are arranged to emit images to different fields of view, respectively.

In the image display panel according to the embodiment, the horizontal lines operate on and off, respectively, based on the fields of view.

Figure 5:
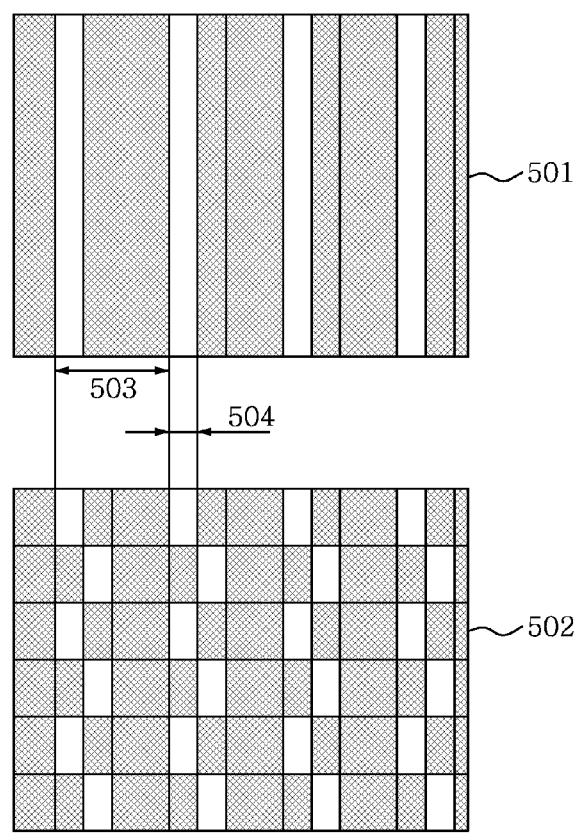
FIG. 5 illustrates an embodiment of a pattern of transparent portions and opaque portions on a parallax barrier of the stereoscopic image display device.

FIG. 5 illustrates an embodiment of a pattern of transparent portions and opaque portions on a parallax barrier of the stereoscopic image display device. The longitudinal parallax barrier with four views 502 is compared with a longitudinal parallax barrier with two views 102.

The barrier 501 has transparent vertical strips and opaque vertical strips periodically, and the distance between the transparent strips and the opaque strip amounts to the cycle of the barrier. The ratio of the cycle 503 of the barrier to the transparent strip 504 may be modified as occasion demands.

The horizontal parallax barrier with four views 502, in which, in order to eliminate field-of-view overlapping effects, two views are added to the positions of overlapping fields of views caused by the barrier having two views, is characterized in the design in which even horizontal pixel lines and odd horizontal pixel lines are separate. The four views modified by adding the two views of the barrier are to minimize resolution loss of the image display device. If there is not the resolution loss, a number of views may be arranged on the positions corresponding to the region of overlapping fields of view at regular intervals. In the barrier having four views, which is modified from the barrier having two views, transparent portions of even lines are spaced horizontally from those of odd lines with a particular distance in the same cycle. While more than two fields of view may be arranged on the region of overlapping fields of view at regular intervals, this may cause resolution loss of the image display device. Therefore, in order to minimize the resolution loss, one view may be added on the region of overlapping fields of view to use even and odd lines. More horizontal lines may be used if necessary, and the number of the horizontal lines is equal to the number of views B which are to be added at regular intervals on the region of overlapping fields of view. If one cycle 503 of the device displaying a parallax image is 100%, the number of views displayed in one cycle is A, and the number of views added on the region of overlapping fields of view at regular intervals is B, the gap between each of the horizontal lines may amount to 100/1+A+B%. For example, in order to add one view to the region of overlapping fields of view existed in the display device having two views, the gap may be 25%.

Figure 6:
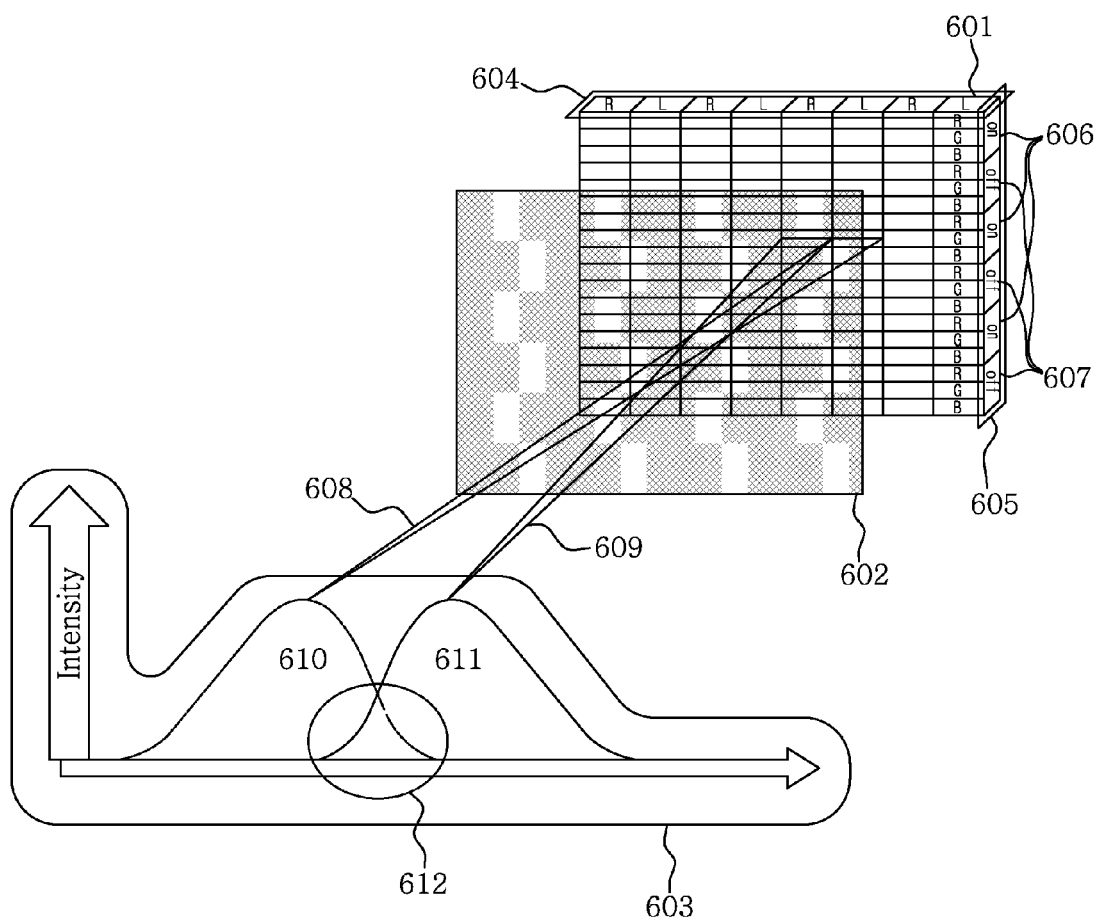
FIG. 6 illustrates the stereoscopic image display device for providing a 3D image of two views using a parallax barrier according to the embodiment.

FIG. 6 illustrates the stereoscopic image display device for providing a 3D image of two views, which act as references among four views, using a parallax barrier according to the embodiment. The device includes an image display panel 601 and a parallax barrier 602. The barrier 602 of FIG. 6 has the same pattern as that of the barrier 502 of the embodiment depicted in FIG. 5. In FIG. 6, RGB color component units are arranged in the transverse direction of pixels on the panel, which is just an example of the arrangement. The component units may be of course arranged in the longitudinal direction.

The distributions of brightness 603 on the fields of view of a viewer for two basic views when the longitudinal parallax barrier is used are explained below.

The image display panel represents images for left and right eyes alternately by pixels (pixel by pixel) in the vertical direction, in order to display the image for both eyes. Only pixels of odd horizontal strips 606 operate, and those of even horizontal strips 607 the do not operate, in order to represent the basic views. That is, when the pixels of odd strips 606 operate, those of even strips 607 do not, and vice versa. Reference numerals 608 and 609 illustrate the paths along which images are provided on the left and right eyes. Reference numerals 610 and 611 represent the distributions of brightness of the two views on the fields of view of the viewer.

When the basic two views operate, it is acknowledged that the fields of view overlap on the region 612 between 610 and 611. The existing devices have failed to display a stereoscopic image on such a region precisely if this phenomenon occurred, but the device disclosed herein may provide accurately a stereoscopic image even on that region, the way of which is depicted in FIG. 7.

Figure 7:
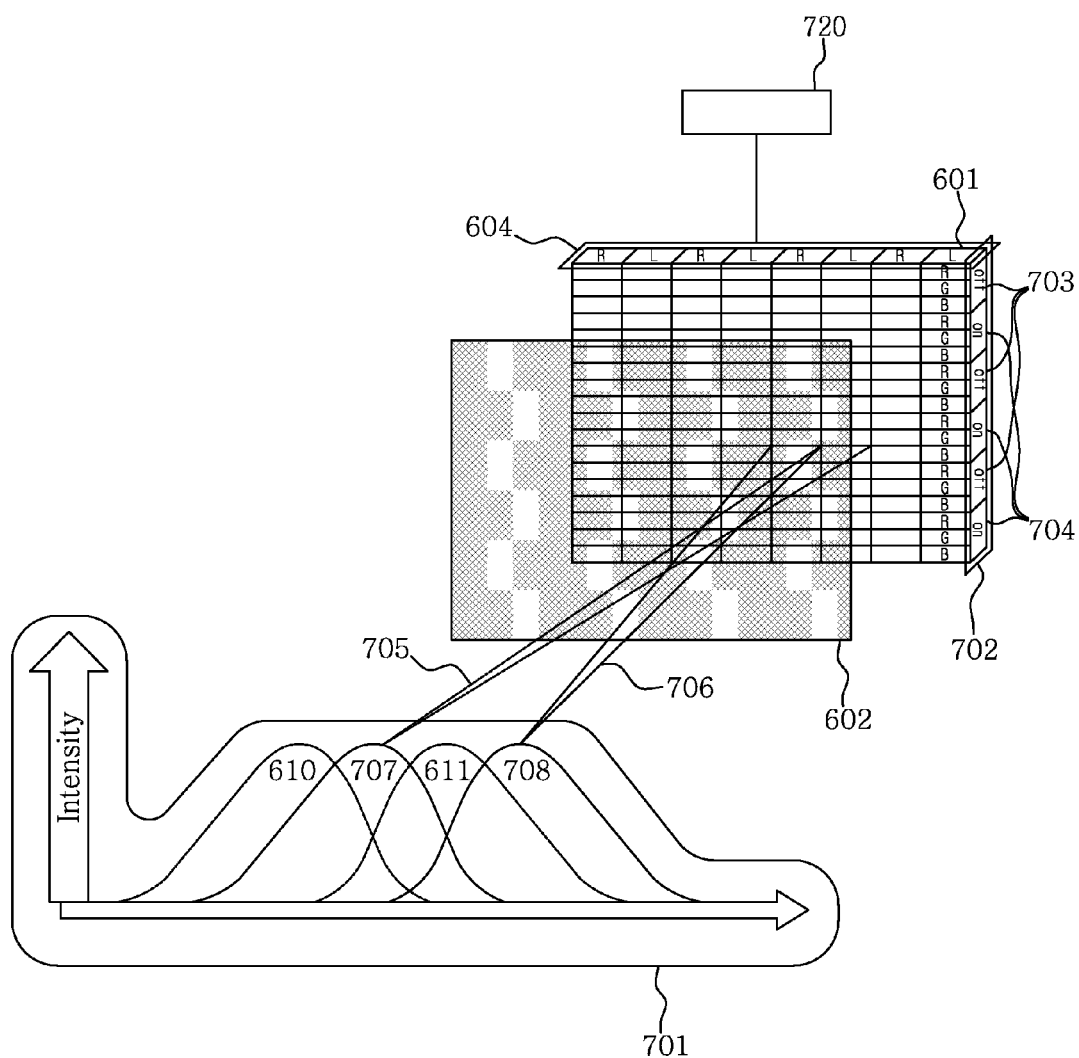
FIG. 7 illustrates a method for eliminating the field-of-overlapping effect using the parallax barrier of FIG. 6 when the eyes of a viewer are located at the overlapping region of the field of view.

FIG. 7 illustrates a method for eliminating the field-of-overlapping effect using the parallax barrier of FIG. 6 when the eyes of a viewer are located at the overlapping region of the field of view. In FIG. 7, RGB color component units are arranged in the transverse direction of pixels on the panel, which is just an example of the arrangement. The component units may be of course arranged in the longitudinal direction.

According to an embodiment, the stereoscopic image display device may further include a position detector 720 for tracking the position of viewer's eyes or the position of the viewer. The detector may acknowledge that the viewer or his eyes is located at the region of overlapping fields of view, on which the fields of view of the images for left and right eyes overlap.

Specifically, when the viewer's eyes are located at the region of overlapping fields of view, as shown in FIG. 6, the location is recognized by the detecting process. If the location of the eyes is recognized as being on the field of view corresponding to the even lines of the image display panel 601, as indicated by reference numeral 702 of FIG. 7, the even horizontal lines are selected and operated, but the odd horizontal lines are not operated. Reference numeral 703 represents the pixels that are not operating, and reference numeral 704 indicates the pixels that are operating. Reference numeral 701 indicates the distribution of the brightness corresponding to the view points on the field of view of the viewer. Reference numerals 705 and 706 refer to the paths along which images are inputted to the left eye and the right eye, and are associated with regions of brightness 707 and 708, respectively. Reference numeral 707 is to include the brightest region on the region 612 of overlapping field of view occurred between 610 and 611 of FIG. 6. The regions represented by numerals 610 and 611 do not actually exist in FIG. 7, but are illustrated for explanatory purpose.

That is, according to the embodiment, even when the viewer's eyes are located at the region of overlapping field of view, the region is recognized to operate the pixels of the even lines, and not to operate the pixels of the odd lines, so that the brightest region is included in the overlapped fields of view.

The stereoscopic image display device according to the embodiment may display a 2D image.

Figure 8:
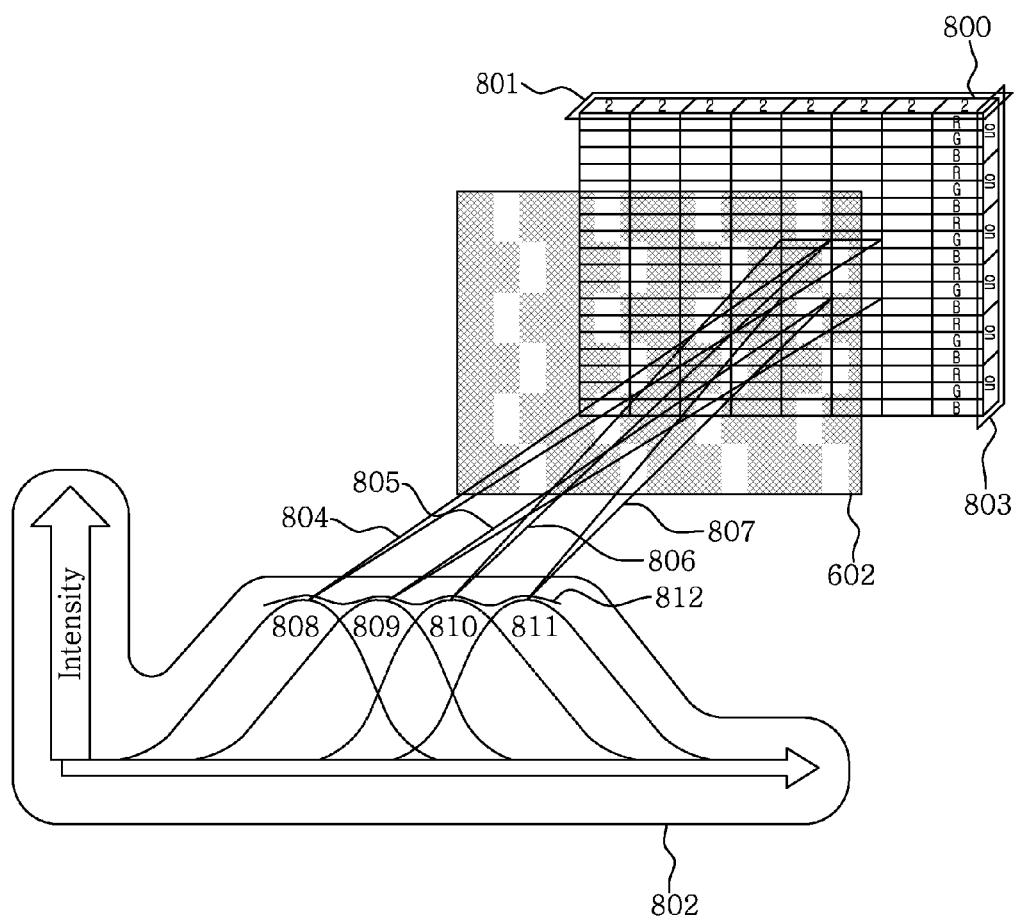
FIG. 8 explains the process for providing a 2D image using a parallax barrier according to the embodiment, and illustrates the brightness distributions on the fields of view.

FIG. 8 explains the process for providing a 2D Image using a parallax barrier according to the embodiment, and illustrates the brightness distributions on the fields of view. An image display panel 800, having pixels in the horizontal direction 801, inputs, not different images to left and right eyes, respectively, but the same 2D image to both eyes. The distribution of brightness on the fields of view of a viewer is illustrated as 802. The odd and even lines of the panel are operated simultaneously.

In existing static parallax barriers, if the same image signals are inputted to the left and right eyes as pixels of the panel are operated, the fields of view are represented only as 808 and 810, and thus the variation of the brightness becomes larger. Accordingly, the static parallax barriers cause a difficulty in 3D/2D conversion.

According to the embodiment, when the same image signals are inputted to the left and right eyes, and the even and odd lines are all operated, four fields of view 808 to 811 are formed. The paths along which images are directed to each of the designated fields of views, when all pixels operate at each view, are indicated as 804 to 807. Reference numerals 808 to 811 illustrate the brightnesses at each of the views produced on the fields of view by 804 to 807. Because the fields of view contains the same image, i.e. the image is seen identically at all spots, the image may be substantially seen at all spots with little variation of brightness, just as the brightness distribution depicted by 812.

The stereoscopic image display device according the embodiment includes a polarizing filter having a particular pattern, and a polarizing film. The device further includes an image display panel in which the horizontal lines operate line by line with particular intervals of time.

In the polarizing filter according the embodiment, polarizing portions and shielding portions are arranged alternatingly. The polarizing portions of the filter have polarizing films having the orientations of polarization perpendicular to each other, and the polarizing films are adjacent.

The image display panel according to the embodiment is attached with polarizing films, and includes the horizontal lines that operate on and off based on the fields of view, respectively. In the polarizing films attached to the panel, the vertical and horizontal orientations are adjacent to each of horizontal lines.

Figure 9A:
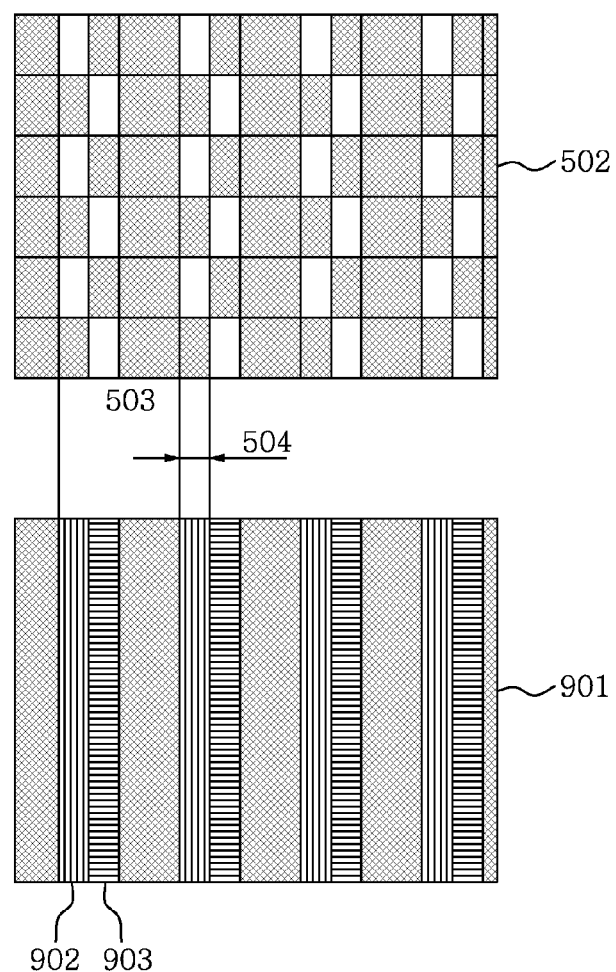
FIGS. 9A to 9C illustrate an embodiment of the stereoscopic image display device.
Figure 9B:
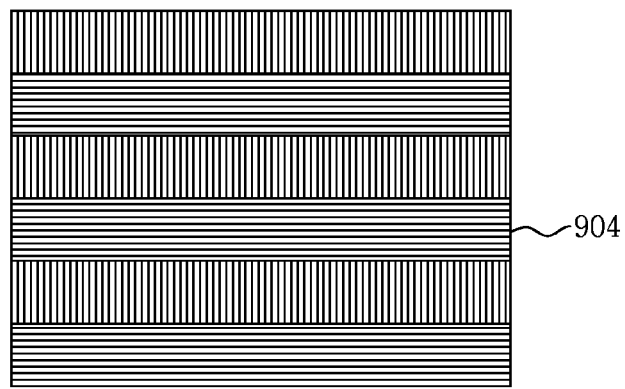
Figure 9C:
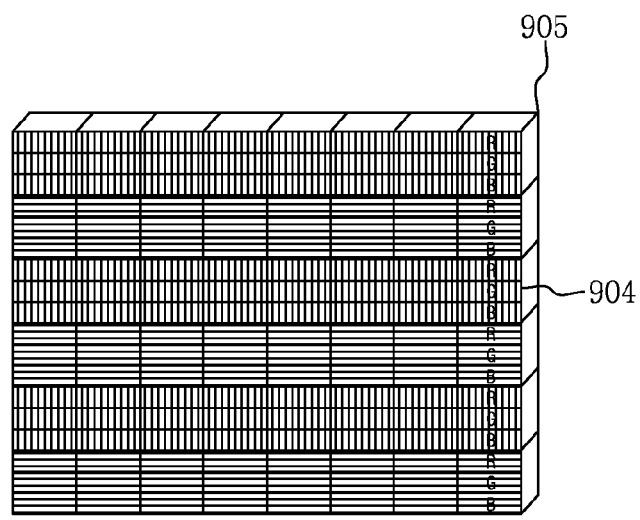

FIGS. 9A to 9C illustrate an embodiment of the stereoscopic image display device.

In FIG. 9A, a polarizing filter is used for the transparent and the opaque portions of the parallax barrier having a particular pattern described in FIG. 5.

The polarizing filter 901 is provided in order to eliminate the field-of-view overlapping effect that may occur by a longitudinal parallax barrier 502 having four views for eliminating field-of-view overlapping effects.

The polarizing filter 901 is provided with polarizing portions and shielding portions. The polarizing portions are composed of vertical polarizing films 902 and horizontal polarizing films 903 adjacent to each other. That is, two kinds of films are used, which are perpendicular to each other in orientation of polarization. In this embodiment, the vertical polarizing films 902 correspond to the odd lines of the parallax barrier 502, and the horizontal polarizing films 903 correspond to the even lines of the barrier 502. The films serve to open the transparent portions in the vertical direction, and to divide the fields of view by adjoining other polarizing films having a different orientation of polarization. The polarizing filter 901 may function as the parallax barrier 502 with a pattern where the vertical and horizontal polarizing films are adjacent to the filter, and thus may eliminate the chromatic aberration occurring in the vertical direction and the fields-of-view overlapping effect.

FIG. 9B illustrates a polarizing film 904, which is to be attached to the display panel and has the opposite polarizing orientations from the adjacent two lines of the longitudinal direction. For example, the odd lines in the transverse direction have transverse polarizing orientation, and the even lines in the transverse direction have longitudinal polarizing orientation. The orientation of polarization of the odd lines are the same as that of the transverse polarizing films 902 of the filter 901, and the orientation of polarization of the even lines are the same as that of the longitudinal polarizing films 903.

FIG. 9c illustrates an image display panel 905 to which the polarizing film 904 is attached. In FIG. 9c, RGB color component units are arranged in the vertical direction of pixels on the panel, which is just an example of the arrangement. The component units may be of course arranged in the horizontal direction.

Figure 10:
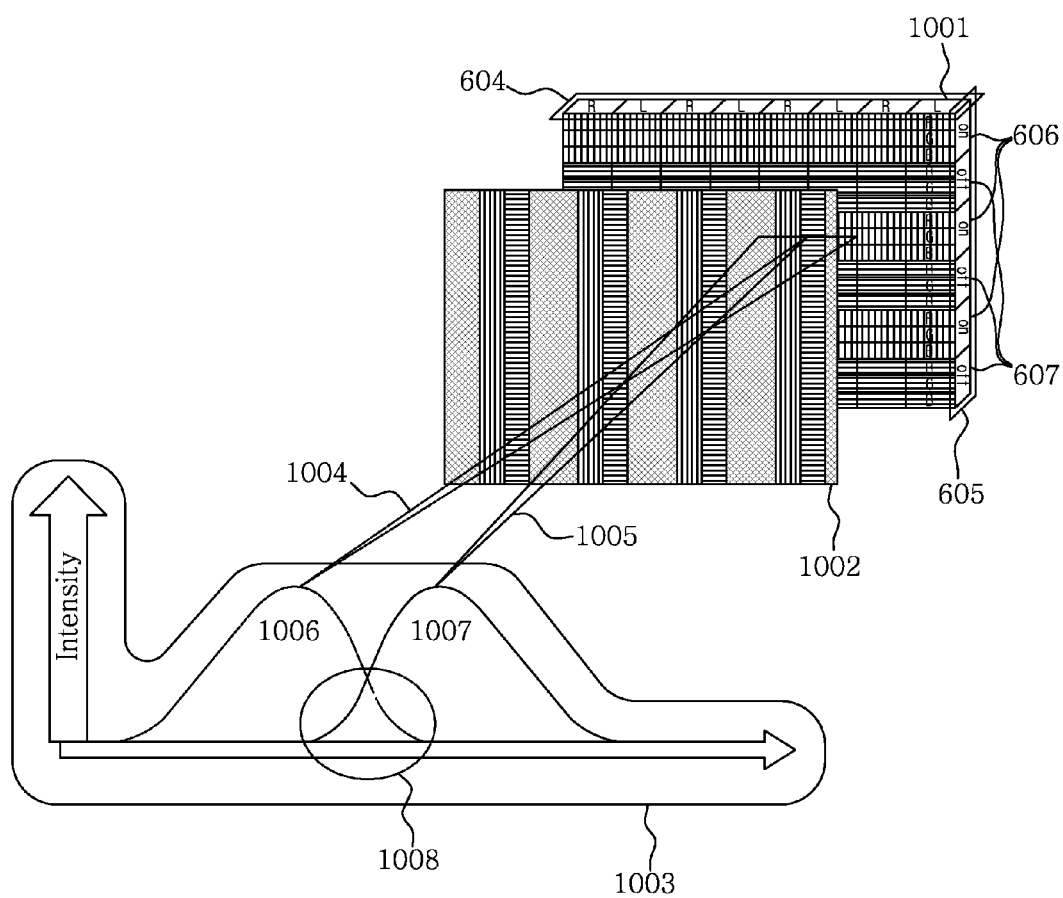
FIG. 10 explains the method for providing a 3D image using the device according to FIGS. 9a to 9c.

FIG. 10 explains the method for providing a 3D image using the device according to FIGS. 9A to 9C.

The stereoscopic image display device according to the embodiment includes an image display panel 1001 to which a polarizing film is attached, and a polarizing filter 1002. The panel 1001 operates differently in its odd lines and even lines in the horizontal direction, which may eliminate the field-of-view overlapping effect.

Specifically, the polarizing orientation of the odd lines of the display panel is identical to that of the transverse polarizing films of the polarizing filter, and the orientation of the even lines of the panel is consistent with that of the longitudinal polarizing films of the filter. Thus, the same effect as that of the stereoscopic image display device according to FIG. 7 may be obtained.

Reference numeral 1003 illustrates the brightness distribution on the field of view of a viewer with respect to two basic views when a polarizing parallax barrier having four views is used. Reference numeral 604 indicates representation of images for right and left eyes alternatingly by pixels (pixel by pixel) in the horizontal direction in order to divide images for both eyes. Reference numeral 605 indicates, in order to represent the basic views, that only the pixels of the odd horizontal lines are operated, but those of the even lines are not operated. The states of the odd and the even lines in the horizontal direction are illustrated by 606 and 607, respectively. The pixels referred to by reference numeral 606 are operating, but the pixels indicated by reference numeral 607 are not operating. The paths along which images are provided to left and right eyes are indicated by 1004 and 1005, respectively. In the field of view of the viewer, the brightness distributions of two views are depicted as 1006 and 1007. The field-of-view overlapping effect 1008 may be acknowledged between 1006 and 1007.

Figure 11:
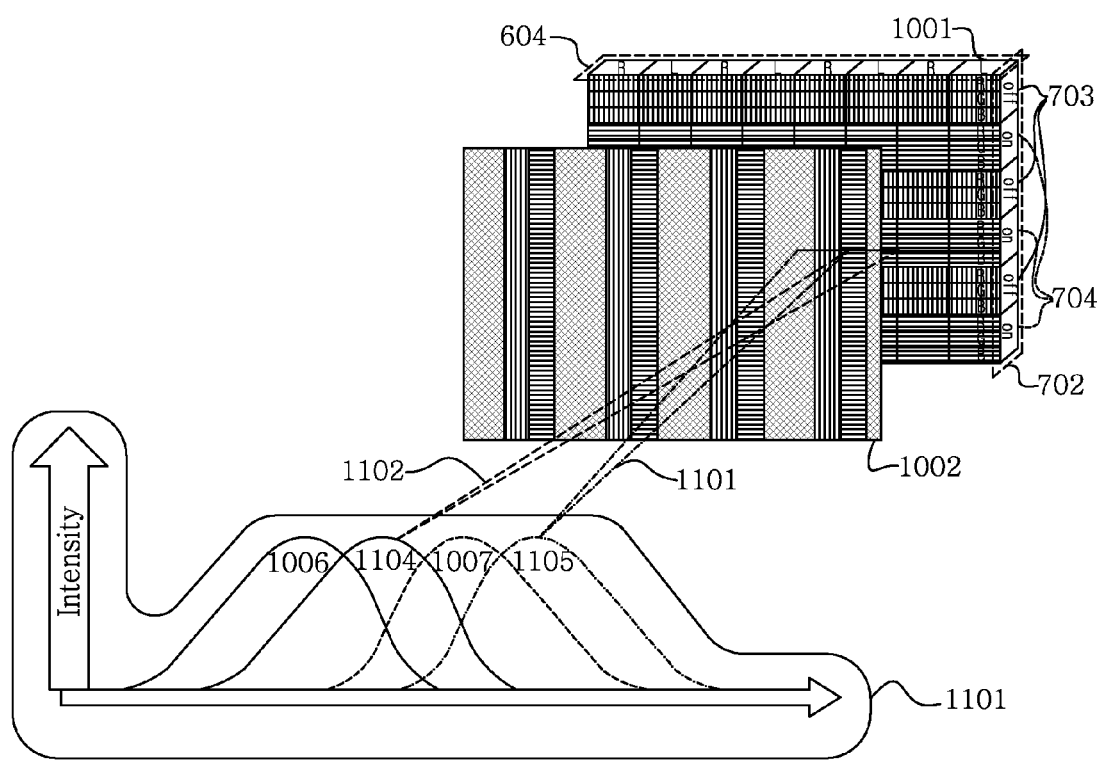
FIG. 11 illustrates a method for eliminating the field-of-view overlapping effect using the optical filter and the image display device of FIG. 10 when a viewer's eyes are located at the overlapping region.

FIG. 11 illustrates a method for eliminating the field-of-view overlapping effect using the optical filter and the image display device of FIG. 10 when a viewer's eyes are located at the overlapping region. If the viewer's eyes are located at the region 1008 of overlapping fields of view as shown in FIG. 10, the location is identified by a detecting method, and the operating pixels in the panel are converted 702. Reference numeral 703 indicates the pixels in the horizontal direction that are not operating, and reference numeral 704 indicates the operating pixels in the horizontal direction. Reference numeral 1101 illustrates the brightness distributions of pixels corresponding to the views on the fields of view of the viewers. The paths along which images are inputted to the left eye and the right eye are referred to by reference numerals 1102 and 1103, to form regions of brightness 1104 and 1105, respectively. This is to include the brightest region on the region of overlapping fields of view occurring between reference numerals 1006 and 1007 of FIG. 10. The regions represented by numerals 1006 and 1007 do not actually exist in FIG. 11, but are illustrated for explanatory purpose.

The stereoscopic image display device according to the embodiment is capable of displaying a 2D image.

Figure 12:
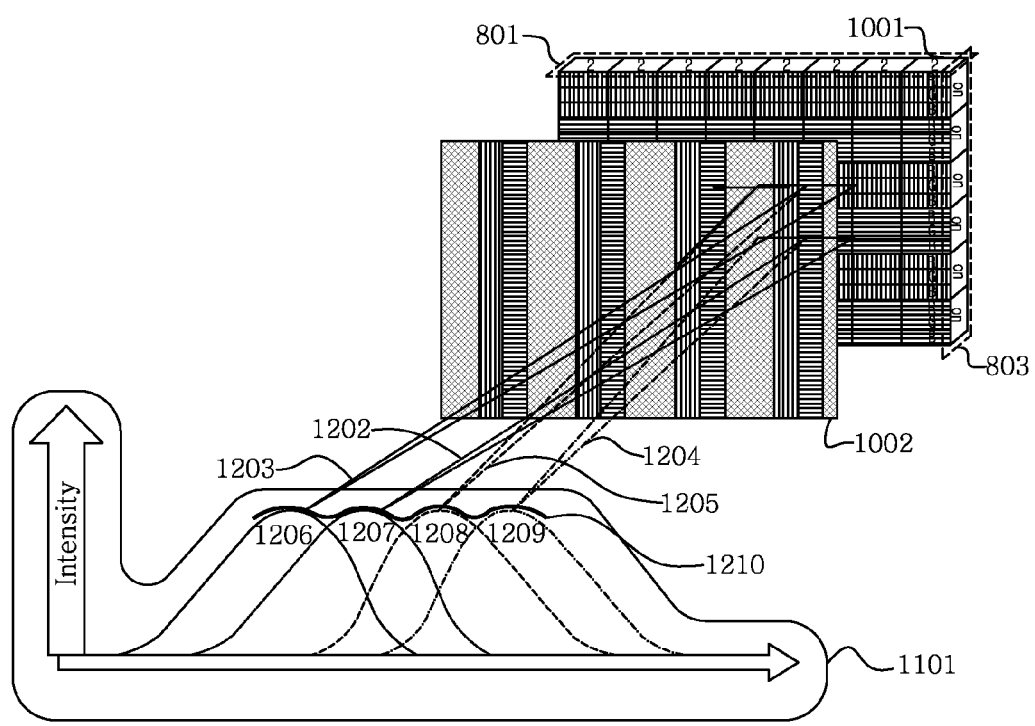
FIG. 12 explains the process for providing a 2D image by the stereoscopic image display device having the polarizing filter according to the embodiment, and illustrates the brightness distributions on the fields of view.

FIG. 12 explains the process for providing a 2D image by the stereoscopic image display device having the polarizing filter according to the embodiment, and illustrates the brightness distributions on the fields of view. An image display panel 1001 inputs not different images to left and right eyes, respectively, but the same 2D images to both eyes. The distribution of brightness on the fields of view of a viewer is illustrated as 1203. Reference numeral 804 and 805 indicate the pixels of odd and even column lines in the longitudinal direction and the pixels of odd and even row lines in the transverse direction operate simultaneously as in the case of FIG. 8.

In existing static parallax barriers, if the same image signals are inputted to the left and right eyes as pixels of the panel are operated, the fields of view are represented only as 1208 and 1210, and thus the variation of the brightness becomes larger. Accordingly, the static parallax barriers make 3D/2D conversion difficult.

According to the embodiment disclosed herein, when the same image signals are inputted to the left and right eyes, and all the even and odd lines are operated, four views 1208 to 1211 are formed. The paths along which images are directed to each of the designated views, when all pixels operate at each view, are indicated as reference numerals 1204 to 1207. Reference numerals 1208 to 1211 illustrate the brightness at each of the views produced at the views by 1204 to 1207. Because the views contain the same image, i.e. the image is seen identically at all spots, the image may be substantially seen at all spots with the variation of brightness minimized, just as the brightness distribution is depicted by 1212.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A 3D (3Dimensional) image display device comprising:
An image display panel having a pixel array with a plurality of pixels arranged in a grid pattern and outputting image signals wherein a plurality of vertical columns of the pixel array are alternatively arranged to comprise columns for a left eye image only and for a right eye image only and each of the pixels is configured with a red sub-pixel, a green sub-pixel and a blue sub-pixel arranged in a vertical direction,
a parallax barrier arranged in front of the image display panel, and having alternatively arranged a plurality of opaque vertical strips extended from top to bottom of the parallax barrier and a plurality of transparent strips each comprises a plurality of transparent portions being displaced alternately on a first side and a second side of a vertical line with a corner of each transparent portion adjacent a corner of another transparent portion on an opposite side of the vertical line, the parallax barrier being located so that each eye of a viewer can perceive one pixel of the pixel array through one of the transparent portions, and
wherein when the image display panel is selected to operate odd horizontal rows of the pixels of the pixel array, whereby a left eye of the viewer at a first position can only perceive the operated pixels in the alternate vertical columns for left eye image only through the transparent portions on the first side of the vertical line and a right eye of the viewer at the first position can only perceive the operated pixels in the alternative vertical columns for right eye image only through the transparent portions on the first side of the vertical line, and
wherein when the image display panel is selected to operate even horizontal rows of the pixels of the pixel array, whereby the left eye of the viewer at a second position can only perceive the operated pixels in the alternate vertical columns for left eye image only through the transparent portions on the second side of the vertical line and the right eye of the viewer at the second position can only perceive the operated pixels in the alternative vertical columns for right eye image only through the transparent portions on the second side of the vertical line.

2. The device according to claim 1, wherein the plurality of transparent portions are spaced from one another by a consistent distance that is determined based on the distance of reference viewing from the device, the sizes and the intervals of views, and a number of views, and the way the image is represented in the image display device.

3. The device according to claim 1, further comprising a position detector for tracking the position of the viewer or the viewer's eyes,
wherein the position detector recognizes that the viewer or the viewer's eyes are located at a field-of-view overlapping region where the fields of view regarding the images of left and right eyes outputted from the image display panel overlap.

4. The device according to claim 3, wherein, if the position detector recognizes the viewer of the eyes of the viewer located at the field-of-view overlapping region, the image display panel turns on the even or odd horizontal rows in which the field-of-view overlapping effect is relatively smaller to the viewer and turns off the other of the even or odd horizontal rows of pixels in which the field-of-view overlapping effect is relatively larger to the viewer.

5. The device according to claim 1, further comprising a 2D (2 Dimensional) display mode, wherein the display panel operates all the pixels simultaneously to display a 2D (2 Dimensional) image.

6. The device according to claim 1, wherein the transparent strips are provided by having a plurality of polarizing portions in a polarizing filter arranged in front of the image display panel, each of which includes a first polarizing vertical strip having a first polarization orientation and a second polarizing vertical strip having a second polarization orientation orthogonal to the first polarization orientation and a polarizing film attached to the image display panel and having a first horizontal film area having he first polarization orientation that is registered with odd horizontal rows of the pixels and a second horizontal film area having the second polarization orientation that is registered with even horizontal rows of the pixels.

7. The device according to claim 6, further comprising a position detector for tracking the position of the viewer or the viewer's both eyes,
wherein the position detector recognizes that the viewer or the viewer's eyes are located at a field-of-view overlapping region where the fields of view regarding the images of left and right eyes outputted from the image display panel overlap.

8. The device according to claim 7, wherein, if the position detector recognizes the viewer or the eyes of the viewer located at the field-of-view overlapping region, the image display panel turns on alternate horizontal rows of the pixels of the pixel array in which the field-of-view overlapping effect is relatively smaller to the viewer, and turns off the remaining horizontal rows of the pixels of the pixel array in which the field-of-view overlapping effect is relatively larger to the viewer.

9. The device according to claim 6, further comprising a 2D (2 Dimensional) display mode, wherein the panel operates all the pixels simultaneously to display a 2D image.

* * * * *